Patented Feb. 20, 1934

1,947,864

UNITED STATES PATENT OFFICE 1,947,864

CATALYST FOR THE PRODUCTION OF NITRIC ACID AND THE LIKE

Louis Jean Alexis Marmier, Lille, France

No Drawing. Application October 15, 1931, Serial No. 569,117, and in Belgium November 4, 1930

4 Claims. (Cl. 23—234)

The invention relates to processes for the production of nitric acid and the like by oxidation of ammonia in the presence of catalysts.

One of the objects of the invention is to render these processes such that they give nitric acid in good yield by utilizing an economical catalyst for the above reaction.

There have already been used as catalysts appropriate metals such, for example as platinum, osmium, manganese, tungsten, molybdenum and the like, and as supports for these metals various porous substances. The use of porous supports permits of utilizing less of the metal and nevertheless of obtaining by reason of the large contact surfaces of these supports a high catalytic effect.

It has already been recognized that it is most advantageous for impregnating the porous supports with the appropriate catalyst to cause these supports to imbibe a solution of a suitable corresponding salt, then to dry and finally to roast them. In this manner, by chemical decomposition, an extremely fine layer of metal presenting a very extended active surface is obtained.

It is also known to regenerate the catalysts of this kind which have become slowly ineffective by usage, by raising them to a temperature higher than that of the reaction.

Until now, use has been made as porous support material of substances such as pumice stone, argilite, asbestos, metallic oxides or analogous substances. In use, however, all these substances show a great inconvenience due to the fact that they are not sufficiently resistant. The roasting for the production of the catalyst and above all, the fact of raising the said catalyst to very high temperatures with a view to its regeneration, cause the porous support to disintegrate slowly and eventually render the catalyst inefficacious.

According to the present invention this inconvenience is obviated.

The said invention consists principally in having recourse as porous support for the catalyst to be used in processes of the kind in question, to pozzuolane or analogous substances (trass notably).

Further features and objects of the invention will appear in the course of the detailed description now to be given by way of example.

According to the invention and more particularly according to that one of its modes of application as well as the modes of realization of its diverse parts, to which it has been decided to accord preference, and supposing that it is desired to obtain nitric acid or certain of its neighbouring derivatives by oxidation of ammonia in the presence of a catalyst the procedure is as follows or analogous thereto.

As far as concerns the production of nitric acid, the operation, as usual, consists in passing over the said catalyst, preheated and disposed in a tube or other appropriate receptacle, a mixture of air or oxygen and ammonia in suitable proportions and in determined conditions, at a temperature of 800 to 900° C., for example.

But as far as concerns the catalyst recourse is had advantageously as porous support for the catalyst material, to pozzuolane or an analogous substance (trass notably).

This support is caused to absorb a solution of a suitable salt, for example, ammonium, tungsten acetate or manganese acetate, ammonium molybdate, but preferably a salt of chromium.

The whole is dried and roasted at a raised temperature for a certain time (for example at 1000° C. for 5 minutes). The salt decomposes and in the pores of the support material the metal of the salt or one or more of its oxides adheres. It is this combination constituted by the support for the catalytic material impregnated with a suitable metallic substance which constitutes the catalyst which is to be used in the operation of producing nitric acid, described above.

Although pumice stone and analogous substances commence to disintegrate at temperatures of the order of 900° C. that is to say at precisely the temperatures which the catalytic combustion of ammonia takes place, pozzuolane may be raised without any difficulty to temperatures of the neighbourhood of 1200° C. The degradation of pumice stone can be prevented only with great difficulty when it is raised to the temperatures necessary for the regeneration and for the formation of the catalyst, while on the contrary the pozzuolane may be heated to these temperatures for a time sufficiently long to obtain a more complete decomposition of the metallic salt absorbed in the support, augmenting, in consequence, the efficacy of the catalyst and finally the yield of nitric acid. It is possible at the same time without difficulty, to reactivate the catalyst which has deteriorated by prolonged use, by heating it for as long a time as is desired to temperatures of the order of 1,000° C.

It is known also that after many operations of regeneration, pumice stone and analogous substances become very seriously affected; pozzuolane in the same conditions remains absolutely unaffected. The destruction of the catalyst which, as stated above, is brought about even during the reaction of the combustion of ammonia, eventually, diminishes, according to the degree of age, the yield of the operation, as a result of the deterioration of the metallic coating which constitutes the active surface of the catalyst.

From other points of view also the utilization of pozzuolane is particularly advantageous. By reason of its more compact structure and by reason of its smaller degree of porosity as compared wth other supports, pozzuolane is more difficult to impregnate in its interior. The metallic covering covers only the only active surface, namely the exterior surface; this fact leads to the use of a smaller quantity of solution of the metallic salt. This is a point of real importance when consideration is given to the very high price of the metals which are generally employed.

Finally, it has been observed that the metallic coating adheres better to pozzuolane than to pumice stone and this is particularly interesting from the point of view of the conservation and utilization of the catalyst, since it is possible to readily submit the metallic coating to appropriate physical treatments (cleaning, washing etc.).

Pozzuolane, which is a volcanic lava, is found in considerable masses in Italy, Germany (trass) and in France. It is a cheap substance and it may be manufactured artificially with the aid of certain argilites.

As will be seen and as will have been obvious from what has preceded, the invention is not limited to any one of those methods of application nor to the embodiment of the diverse parts which have been more particularly described. It includes, on the contrary, all variants.

What I claim is:—

1. A catalyst for the oxidation of ammonia into nitric acid, comprising lumps of a material having the physical and chemical properties of pozzuolane and capable of withstanding temperatures higher than 900° C. without substantial modification, each lump having its peripheral portion impregnated with a finely divided chromium oxide.

2. A catalyst for the oxidation of ammonia into nitric acid, comprising lumps of pozzuolane, each lump having its peripheral portion impregnated with a finely divided chromium oxide.

3. The method of producing a catalyst for the oxidation of ammonia into nitric acid, which comprises impregnating lumps of a substance having the physical and chemical properties of pozzuolane and capable of withstanding temperatures higher than 900° C. without modification with a substance capable of promoting the reaction between ammonia and oxygen, and heating said impregnated substance at a temperature higher than 900° C.

4. The method of producing a catalyst for the oxidation of ammonia into nitric acid, which comprises impregnating lumps of a substance having the physical and chemical properties of pozzuolane and capable of withstanding temperatures ranging between 900° C. and 1100° C. without modification with a salt of chromium, and heating said impregnated substance at a temperature of about 1000° C. so as to transform the salt into chromium oxide.

LOUIS JEAN ALEXIS MARMIER.